(12) United States Patent
Dwekat et al.

(10) Patent No.: US 7,613,129 B1
(45) Date of Patent: Nov. 3, 2009

(54) MANAGING INFORMATION DESCRIBING A COMMUNICATIONS NETWORK

(75) Inventors: Zyad Ahmad Dwekat, Raleigh, NC (US); Kenneth Tedder, Overland Park, KS (US); Kevin Thomas Boland, Olathe, KS (US)

(73) Assignee: Embarq Corporation, Overland Park, KS (US)

( * ) Notice: Subject to any disclaimer, the term of this patent is extended or adjusted under 35 U.S.C. 154(b) by 650 days.

(21) Appl. No.: 11/159,800

(22) Filed: Jun. 23, 2005

(51) Int. Cl.
*H04L 1/00* (2006.01)
*H04L 12/26* (2006.01)

(52) U.S. Cl. ................. 370/254; 370/229; 370/252

(58) Field of Classification Search ............. 370/400, 370/401, 317, 254, 229, 252
See application file for complete search history.

(56) References Cited

U.S. PATENT DOCUMENTS 6,982,984 B1 * 1/2006 Asayesh et al. ............. 370/401
2002/0122394 A1 * 9/2002 Whitmore et al. ........... 370/328

* cited by examiner

*Primary Examiner*—Ronald Abelson
(74) *Attorney, Agent, or Firm*—Sonnenschein Nath & Rosenthal LLP

(57) ABSTRACT

A system and method for managing information describing a communications network. In accordance with the present invention, a set of communication devices are identified, and one or more identifiers are assigned to each of the devices. A workbook storing the assigned identifiers is maintained, and a network specification book is provided. The network specification book includes specification information associated with the communications network, including the assigned identifiers. An update tool is utilized to automatically insert at least a portion of the specification information into the workbook.

20 Claims, 7 Drawing Sheets

MANAGING INFORMATION DESCRIBING A COMMUNICATIONS NETWORK

CROSS-REFERENCE TO RELATED APPLICATIONS

None.

STATEMENT REGARDING FEDERALLY SPONSORED RESEARCH OR DEVELOPMENT

None.

BACKGROUND

Implementing and managing a communications network is a challenging endeavor. Managing the setup, routing, utilization, and performance of a network's large number of connections and hardware is a monumental task, and, generally, a variety of different commercial entities must work together to create and administrator the network.

With different entities involved in the operation of a network, the management of information becomes critically important. Further, because different networks must maintain the ability to communicate with one another, various standards and administrative bodies also dictate how network elements must be described. For example, modern communication systems often require that certain communication devices be assigned an identifier called an Internet protocol (IP) address. These IP addresses can identify a device on a local network and on the Internet. As will be understood by those skilled in the art, a device's IP address is an important piece of information, and two devices on a network must not share the same IP address. Thus, with different groups and entities working on a given network, it is important to maintain control of the assignment of identifiers such as IP addresses.

Currently, maintaining network information can be a tedious task susceptible to human error. For example, an entity may attempt to maintain a listing of all IP addresses assigned to the various devices in a network. However, with different organizations developing and changing the network, any alteration in the network's design specification or an IP address assignment will render the listing inaccurate. To remedy this incorrect listing, generally a manual change to the listing is required. Further, the inaccuracy may not be detected until either a comparison between the entire network and the listing is performed or until an error is experienced. With so many devices in a network, manual updating of information becomes an overwhelming task, fraught with the potential for human error. Thus, considering the great importance of accurately compiling information describing a network, those in the art will recognize the need for techniques to facilitate the management and exchange of network information.

Accordingly, there is a need for improved systems and methods capable of managing information describing a network. There is also a need for improved capabilities allowing the exchange of network information between multiple locations housing such information.

SUMMARY

The present invention meets the above needs and overcomes one or more deficiencies in the prior art by providing systems and methods for managing information describing a communications network. In one aspect of an embodiment of the present invention, a computer-implemented method is provided. A set of communication devices is identified, and one or more identifiers are assigned to each of the devices. A workbook storing the assigned identifiers is maintained, and a network specification book is provided. The network specification book includes specification information associated with the communications network, including the assigned identifiers. An update tool is utilized to automatically insert at least a portion of the specification information into the workbook.

Another aspect of an embodiment of the present invention includes a system for managing data associated with a communications network. The system includes a plurality of communication devices. Each of the devices is assigned at least one identification indicia, and a workbook maintains a listing of the assigned identification indicia. A network specification book is also included. The specification book contains specification information associated with the communications network, including the assigned identification indicia. The system further includes an update tool configured to extract a portion of the specification information from the network specification book and to insert the extracted information into the workbook.

A further aspect of an embodiment of the present invention includes a computerized method for managing information describing a communications network. A standardized format for listing elements of information associated with communications devices is provided. The method also provides a standardized set of specification information for describing a network. A set of common items of information utilized by both the standardized format and the standardized set of specification information is identified. An update tool is provided to automatically coordinate an exchange of the common items between a first document formatted according to the standardized format and a second document formatted according to the standardized set of specification information.

BRIEF DESCRIPTION OF THE SEVERAL VIEWS OF THE DRAWING

The present invention is described in detail below with reference to the attached drawing figures, wherein.

DETAILED DESCRIPTION

Figure 1:
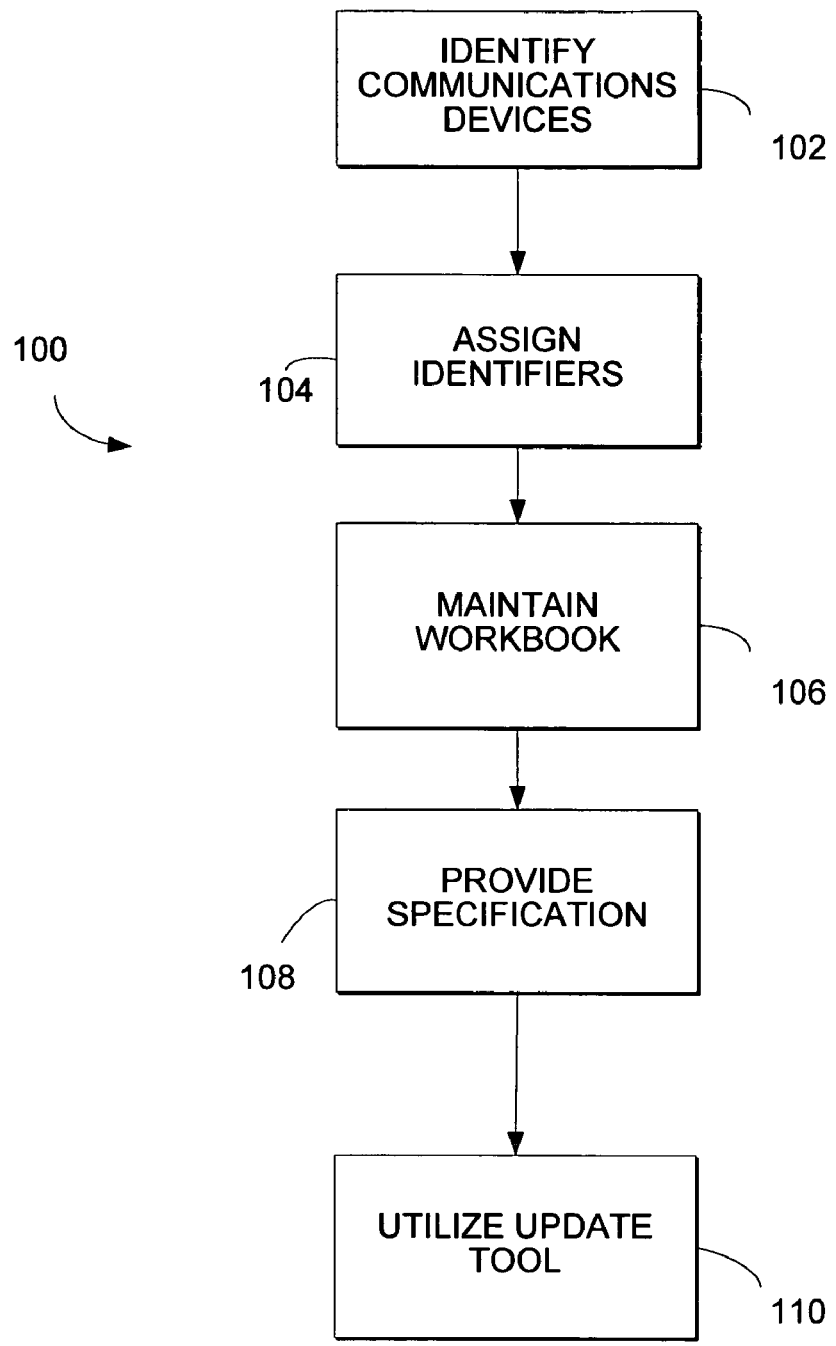
FIG. 1 illustrates a method in accordance with the present invention for managing network information.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for managing network information. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention is acceptable for use with any number of communication networks and is not limited to any one particular network type. As will be understood by those skilled in the art, a network is comprised of a plurality of communications devices. A communication device may be any device capable of affecting the receiving and transmitting of communication data. Examples of possible communication devices are switches, routers, hubs, processors, servers, computers (desk top, lap top, tablet, or any other type), telephones, video conferencing equipment, or any other device capable of affecting the receiving and transmitting of communication data over a network.

A network in accordance with the present invention may be any network using any transmission medium, combination of transmission media, equipment, or combination of equipment capable of transmitting data. Those skilled in the art will recognize that the present invention may be implemented with a variety of different types of networks, including circuit and packet-based networks. Further the network may include functionality allowing a combination of packet and circuit networking technologies.

As an example of a network acceptable for use with the present invention, a network may be a packet-based network. When a communication device connects to a packet-based network, the communication device transmits data packets to a server over the network. The packets transmitted from the communication device to the server may identify the communication device to the server. The packets transmitted from the communication device to the server may also authenticate the communication device and establish a security protocol between the communication device and the server. The transmission of data packets from a communication device to a server and the transmission of data packets from a server to a communication device may be referred to as a data packet exchange. The communication device may also transmit data packets to the server requesting a service. A service may be any communication service, either now existing or later developed, such as voice telephony, voice-mail, text messaging, e-mail, video, audio or any other service. The server may direct the communication device to the service in a variety of ways. For example, the server may transmit data packets to the communication device instructing the communication device how to contact the desired service. By way of further example, the server may transmit data packets to the desired service instructing the service to contact the communication device requesting the service. By way of yet further example, the server may exchange data packets with both the communication device and the service acting as an intermediary. A service may also transmit data packets to the server requesting a particular communication device. The server may direct the service to the communication device in a variety of ways, similar to the ways the server may direct a communication device to a desired service.

FIG. 1 illustrates a method 100 for managing network information in accordance with the present invention. At a step 102, the method 100 identifies a set of communication devices. A communication device may be any device capable of affecting the receiving and transmitting of communication data. Examples of such communication devices are switches, routers, processors and interface devices. The identified communication devices may make up at least a portion of a communications network. As previously mentioned, the present invention is acceptable for use with a variety of communications networks. As will be appreciated by those skilled in the art, communications networks require the interaction of various communication devices. According to one embodiment of the present invention, the identified communication devices are part of a communications network that is yet to be implemented. Thus, the identification of the devices may be related to the design or implementation of a yet-to-be implemented network.

At a step 104, the method 100 assigns identifiers to at least a portion of the communication devices. As will be appreciated by those skilled in the art, a variety of identifiers are assigned to devices in a communication network, and these identifiers have a variety of purposes and functions. For example, communication systems often require that certain communication devices be assigned an IP address. These IP addresses can help identify a device on a local network and on the Internet. An IP address, as well as other network identifiers known in the art such as ATM addresses, must be assigned in accordance with standards governed by a standards body. Other identifiers may indicate characteristics of a device. For example, the location or make/model of the device may be specified within an identifier assigned at 104. By incorporating such logic into the assignment of identifiers, information or data may be associated with a device for use and tracking of the device. In sum, the present invention contemplates the assignment of variety of informational elements to the communication devices.

To store the assigned identifiers, the method 100 maintains a workbook at a step 106. The workbook may be any means to store information such as the identifiers. For example, the workbook may be a spreadsheet file or may be a more complex database. Further, the workbook may be organized in a variety of different formats. The workbook may contain a variety of other information or data related to the communication device or the network. Those skilled in the art will recognize that storing identifiers in a single location such as the workbook may facilitate the tracking of data and information about devices and may facilitate sharing of network information.

At a step 108, the method 100 provides a network specification book. The network specification book may be any set of specifications describing the communications network. The specification book may be stored and organized according to any number of formats. According to some embodiments of the present invention, the network specification book describes the logical and physical layoff of the network. The specification book may include the location of equipment, the assignment of ports, the various identifiers associated with different devices and any other information necessary to implement the communications network. For example, the specification book may include IP addresses, ATM addresses, element names, port assignments, transports, and switch settings. At least a portion of the information from the workbook may also be included in the specification book. The specification book may also include identifiers not stored in the workbook. Those skilled in the art will recognize that the specification book may contain a wide variety of information pertinent to the network.

The method 100 utilizes an update tool at a step 110 to insert at least a portion of the information from the specification book into the workbook. According to one embodiment of the present invention, various identifiers are assigned to communications devices during the compilation of the specification book. This information may be inserted into the workbook by the update tool. Further, the assignment of identifiers may be changed during the implementation and throughout the life of a network. To the extent that these changes are reflected in the specification book, the update tool may insert these changed identifiers into the workbook as well. The update tool may also be used to insert information from the workbook into the specification book. Further, the tool may be used to verify the consistency of the information contained in the specification book and the workbook. The tool may also update the status of an identifier or a device in the workbook or the specification book. For example, a previously inactive IP address may be marked "active" during the update. Those skilled in the art will recognize that a wide variety of information may be shared and exchanged between the two sources by the update tool.

Figure 2:
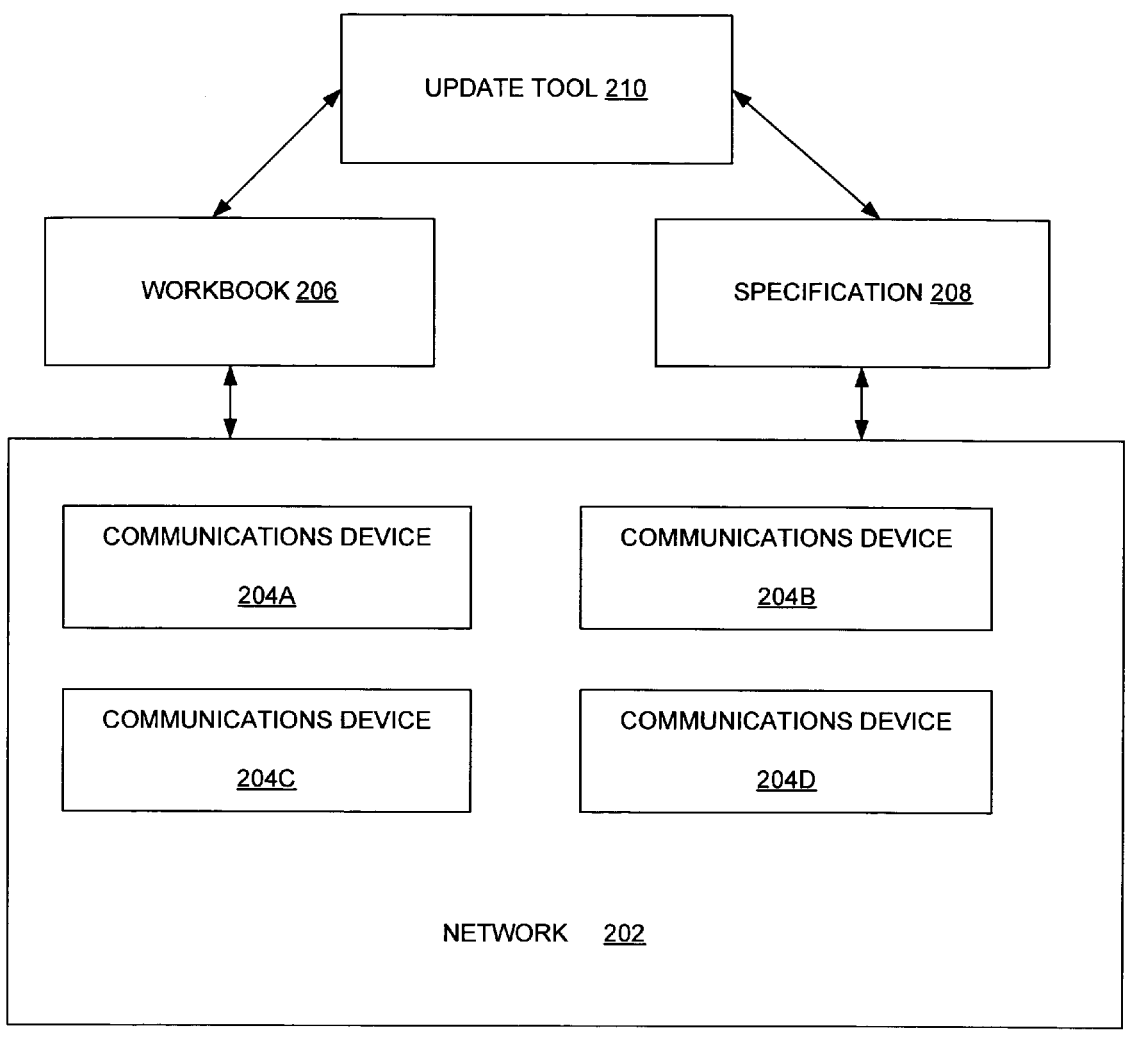
FIG. 2 illustrates a system in accordance with the present invention for managing data associated with a communications network.

FIG. 2 illustrates a system 200 for managing data associated with a communications network in accordance with the present invention. The system 200 includes a network 202 which comprise a plurality of communication devices 204A, 204B, 204C and 204D (collectively hereinafter "communication devices 204"). The network 202 may be any network using any transmission medium, combination of transmission media, equipment, or combination of equipment capable of transmitting data. The various communications devices 204 may be any devices that interact with network 202 and/or which aid in the communication of network data. The communication devices 204 may be assigned at least one identification indicia. Those skilled in the art will recognize that devices in a network are often assigned a variety of identifiers, such as IP addresses, which serve to identify the device and/or provide information describing the device. Accordingly, an identification indicia in accordance with the present invention may any information associated with one of the communication devices 204.

The system 200 also includes two sources that maintain data associated with the network 202, a workbook 206 and a specification book 208. The workbook 206 maintains a listing of the assigned identification indicia. The workbook 206 may provide means for managing the indicia and may associate a wide variety of information with the communication devices 204. The workbook 206 may also include functionality beyond mere storing of identifiers. For example, the workbook 206 may contain the means to generate the identification indicia or means to obtain information from the indicia. Because assignment of the identification indicia can involve application of standards or other underlying logic, the workbook 206 may contain tools to verify the correctness of assigned indicia or to assign such indicia to the devices 204. The workbook 206 may have different tabs or sections for different levels of identifier assignment. For example, the workbook 206 may have tabs for signaling, operations, maintenance and/or provisioning. As will be understood by those skilled in the art, the workbook 206 may contain a variety of information associated with the communication devices 204 and may also contain various tools to organize and interact with this information.

The system 200 also includes a specification book 208. The specification book 208 may include any set of specifications associated with the communications network, including the assigned identification indicia. The specification book 208 may contain the information necessary to implement the communications network and all other information pertinent to the network. According to one embodiment of the present invention, the specification book 208 is created with reference to the workbook 206. The specification book 208 may also include identifiers and information not stored in the workbook 206.

An update tool 210 is also included in system 200. The tool 210 is configured to communicate with the workbook 206 and the specification book 208. Accordingly to one embodiment of the present invention, the update tool 210 automatically extracts information from the specification book 208 and inserts this extracted information into the workbook 208. As previously mentioned, the workbook 206 and the specification book 208 may include different sets of information and/or may contain copies of the same information. The update tool 210 interacts with both the books 206 and 208 and coordinates an exchange of information. For example, the specification book may store a set of identifiers associated with communication devices 204. The update tool 210 may be designed to access the specification book 208, extract the set of identifiers, and input the identifiers into the workbook 206. Further, both of the books 206 and 208 may contain a listing of a particular identifier. The update tool 210 may be utilized to verify that the listings in each of the books 206 and 208 are identical. As a related application of the update tool 210, if an identification assignment is altered in the specification book 208, the update tool 210 may be used to make this change in the workbook 206 as well. Those skilled in the art will recognize that the update tool 210 may perform any number of operations associated with coordinating the exchange of data between the workbook 206 and the specification book 208.

Figure 3:
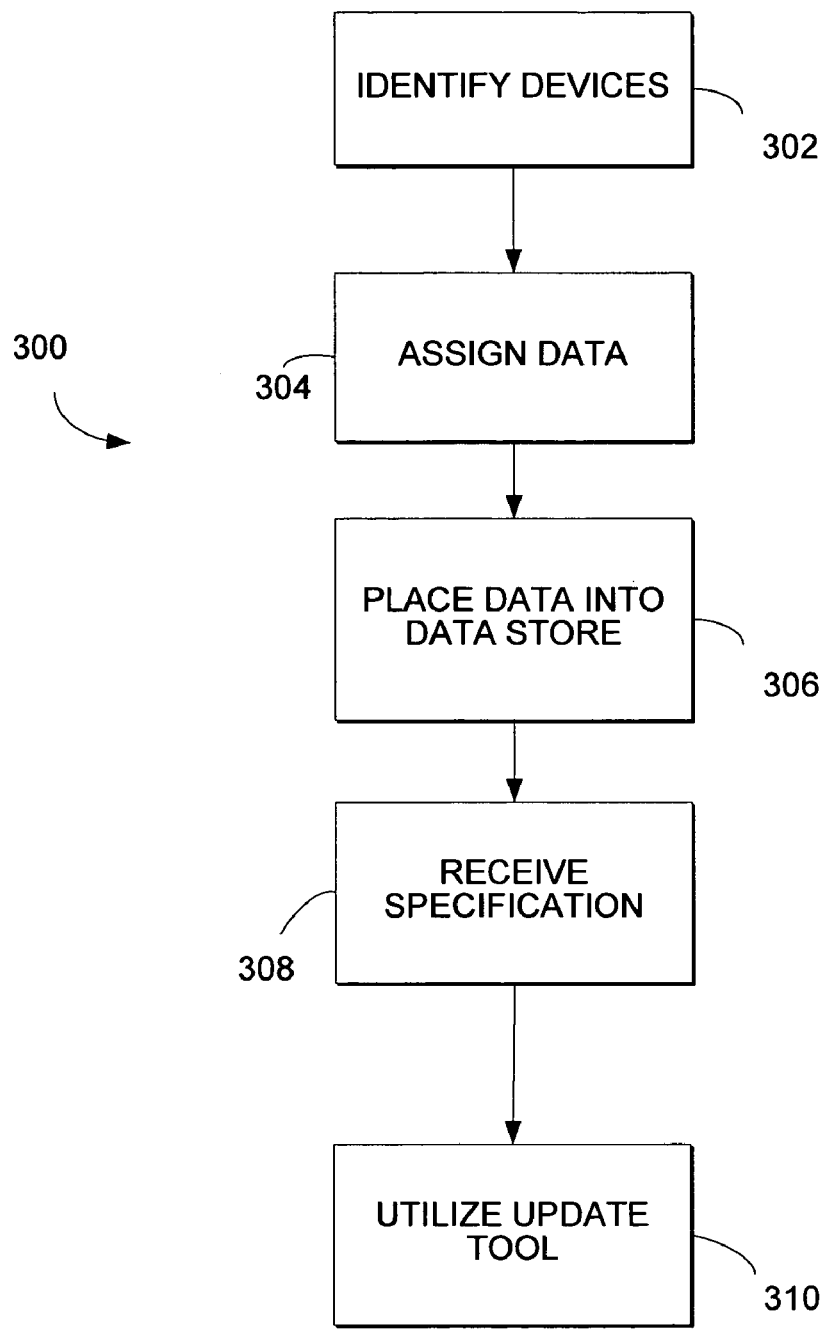
FIG. 3 illustrates a method in accordance with the present invention for automating the exchange of data associated with a communications network.

FIG. 3 illustrates a method 300 for automating the exchange of data associated with a communications network in accordance with the present invention. At a step 302, the method 300 identifies a plurality of devices for use in a communications network. Any number of devices may be identified, and any type of communication network is acceptable for use with the present invention.

One or more elements of data are assigned to the identified devices at a step 304. Any type of data is acceptable for assignment to the identified devices. For example, the assigned data may be an IP address or the may be information identifying the location of the device. At a step 306, the method 300 places the data elements into a data store. Any type of data store is acceptable for use with the present invention, including the previous discussed workbook. Those skilled in the art will appreciate that a variety of data stores capable of storing the elements of data exist in the art.

At a step 308, a set of specification information associated the communication network is received. The set of specification information may include any information or data directed at the logical or physical layout of the network. The specification information may also include any assignments associated with the network, such as IP addresses associated with communication devices.

An update tool is utilized at a step 310 to automatically import at least a portion of the data from the data store into the specification information. Optionally the update tool may also import data from the specification information into the data store. Further, the update tool may be used to verify that the information in the data store and the specification information is accurate. According to one embodiment of the present invention, the entity in control of the data store has limited control over the creation of the specification information. Thus, upon receipt of the specification information at the step 308, it may be desirable to verify that the specification information is correct, to update the data store with information from the specification information and/or to export additional data into the specification information. To automatically perform these and other exchanges/verifications of information, the update tool may be utilized as set forth herein.

Figure 4:
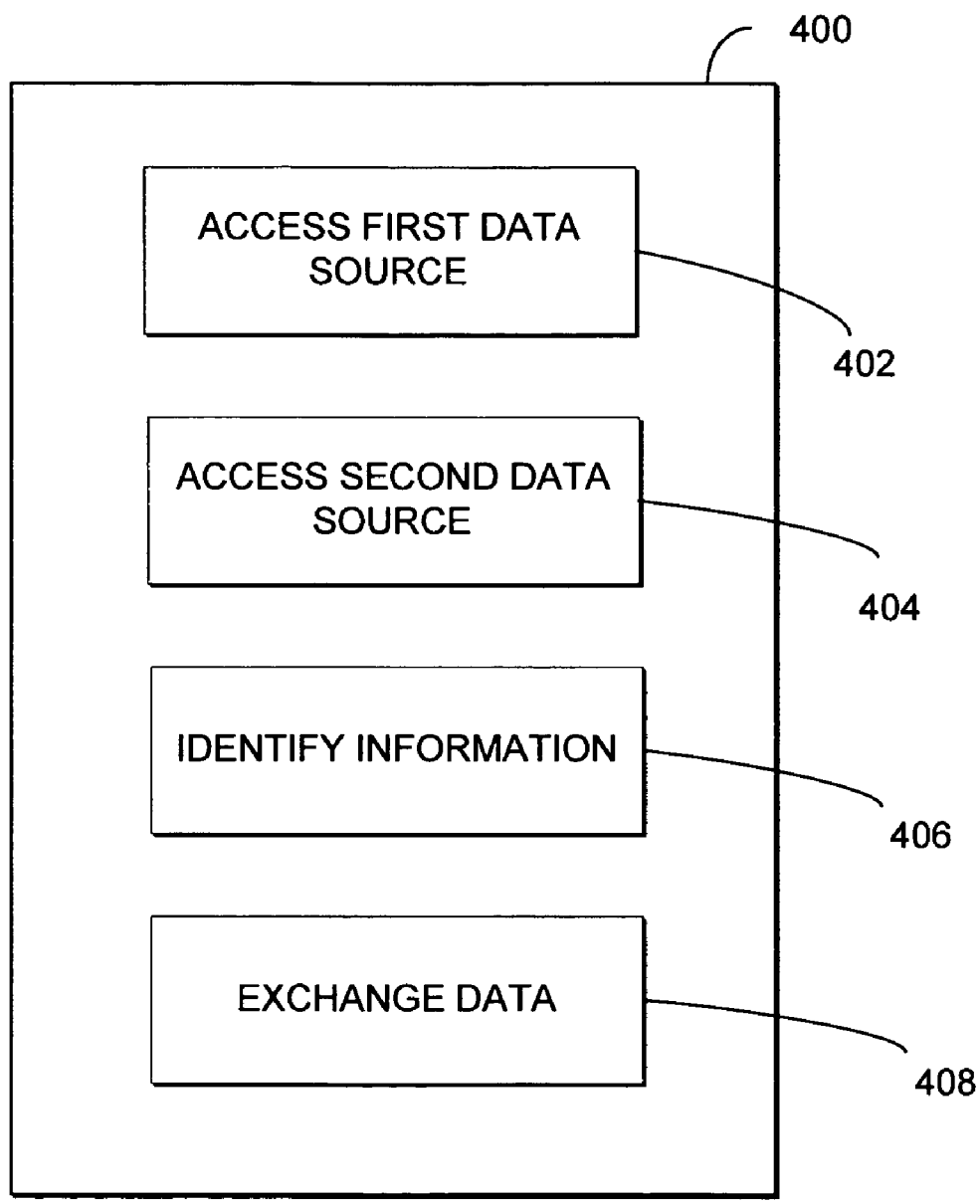
FIG. 4 is a schematic diagram representing a computer-readable media in accordance with the present invention.

FIG. 4 illustrates a computer-readable media 400 that includes instructions for coordinating the exchange of information between two sources. The media 400 includes the instructions 402 for accessing a first data source. The instructions 402 may include the capacity to read and to interact with the data in the first data source. The first data source may be any number of data sources and may contain a variety of data elements. For example, the first data source may include a listing of identification indicia associated with communication devices in a network.

To access a second data source, the media 400 includes the instructions 404. The instructions 404 may include the capacity to read and interact with the data in the second data source. The second data source may include a set of specification information describing the network. A wide variety of specification information may be stored in the second data source, including identification indicia associated with communication devices.

The media 400 also includes instructions 406 for identifying which items of information stored in either the first or second data stores should be exported to the other data store. For example, the instructions 406 may be configured to identify a set of information residing in the first data store that needs to be exported into the second data store. In one embodiment of the present invention, the first data store contains a listing of identifiers associated with a set of devices. If the second data store contains additional identifiers or conflicting listings, the instructions 406 are configured to identify these identifiers for possible exportation. Those skilled in the art will recognize that any number of scenarios exist in the art wherein two sources of data need to exchange information and that the instructions 406 may be configured to identify such information.

To coordinate the exchange of the identified information, the media 400 includes the instructions 408 which are configured to copy the identified information from one source and insert it into a location in the other source. Those skilled in the art will appreciate that known techniques exist in the art for the exchange of data between two data sources and that any conventional techniques are acceptable for use with the present invention.

Figure 5:
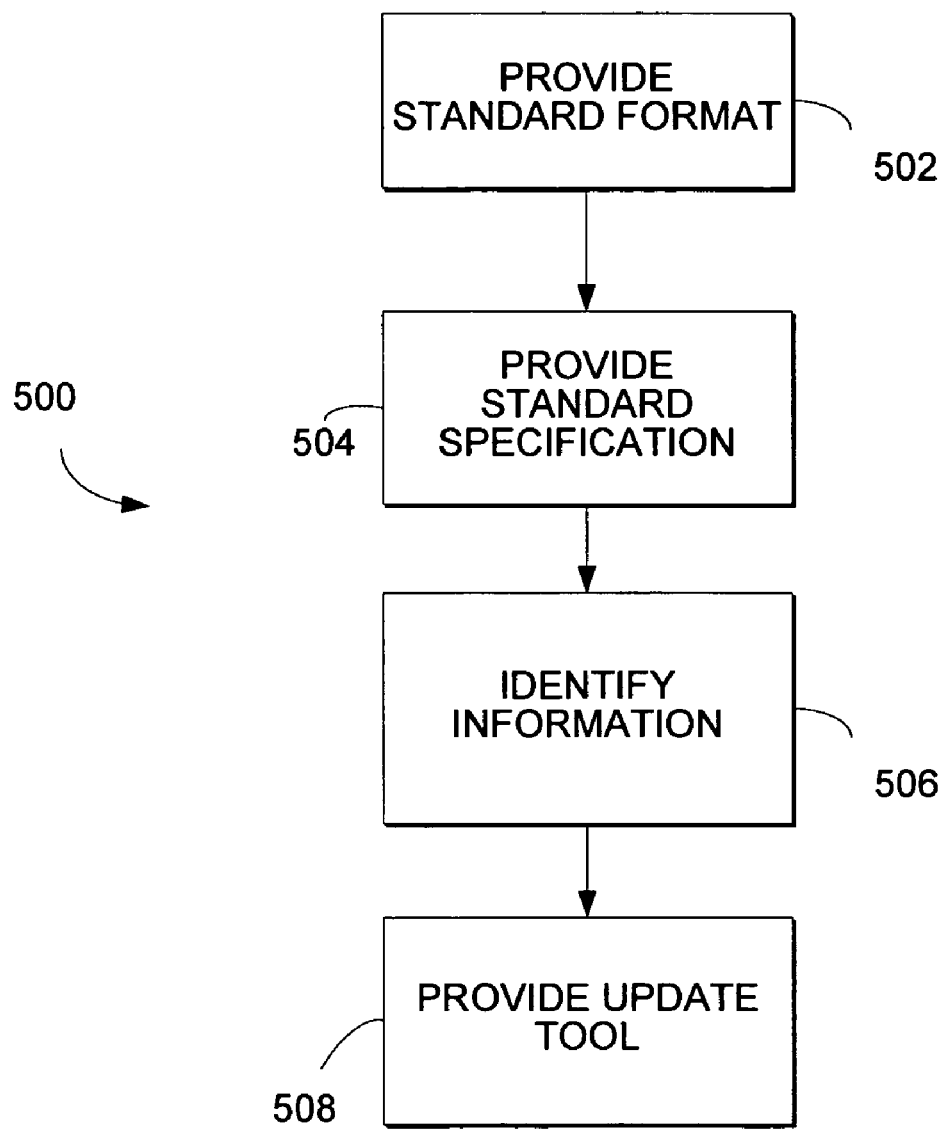
FIG. 5 illustrates a method in accordance with the present invention for managing information describing a network.

FIG. 5 illustrates a method 500 for managing information describing a network in accordance with the present invention. At a step 502, the method 500 provides a standardized format for listing information associated with a plurality of communication devices. Any number of formats are acceptable for the standardized format. According to one embodiment, the standardized format organizes information in a known orientation. As will be appreciated by these skilled in the art, by predictably listing the information in a standard format, an automated tool can evaluate and perform operations on the listed information. For example, a standardized workbook may dictate how a listing of identifiers associated with a communications network should be organized. Thus, if the standardized format is used to create a plurality of workbooks associated with different communication networks, automated operations may be performed on the various workbooks.

At a step 504, a standardized set of specification information for describing the network is provided. As with the standardized format, the standardized set of specification information allows a network to be described in a predictable manner that can be repeated for different networks. As previously discussed, such a standardized format facilitates use of automated software tools to interact with the information.

The method 500 at a step 506 identifies a set of common information utilized in both the standardized format and the standardized set of specification information. For example, both the standardized format and the standardized set may have fields where the same identifier must be populated. The method 500 may also identify known relationships that exist between sets of information stored in accordance with the standardized forms.

At a step 508, the method 500 provides an update tool configured to automatically coordinate the exchange of data between two sources of information that are stored in accordance with the standardized forms. Those skilled in the art will appreciate that, because the stored information has known characteristics, the update tool can automatically exchange data between to the two sources and can govern relationships between the data. For example, a network may be described with a standardized workbook and a standardized specification book. The update tool can insure that each book includes a complete and accurate listing of identifiers associated with communication devices. Further, because of the standard nature which network information is stored, the update tool need not be adapted for each network.

Figure 6:
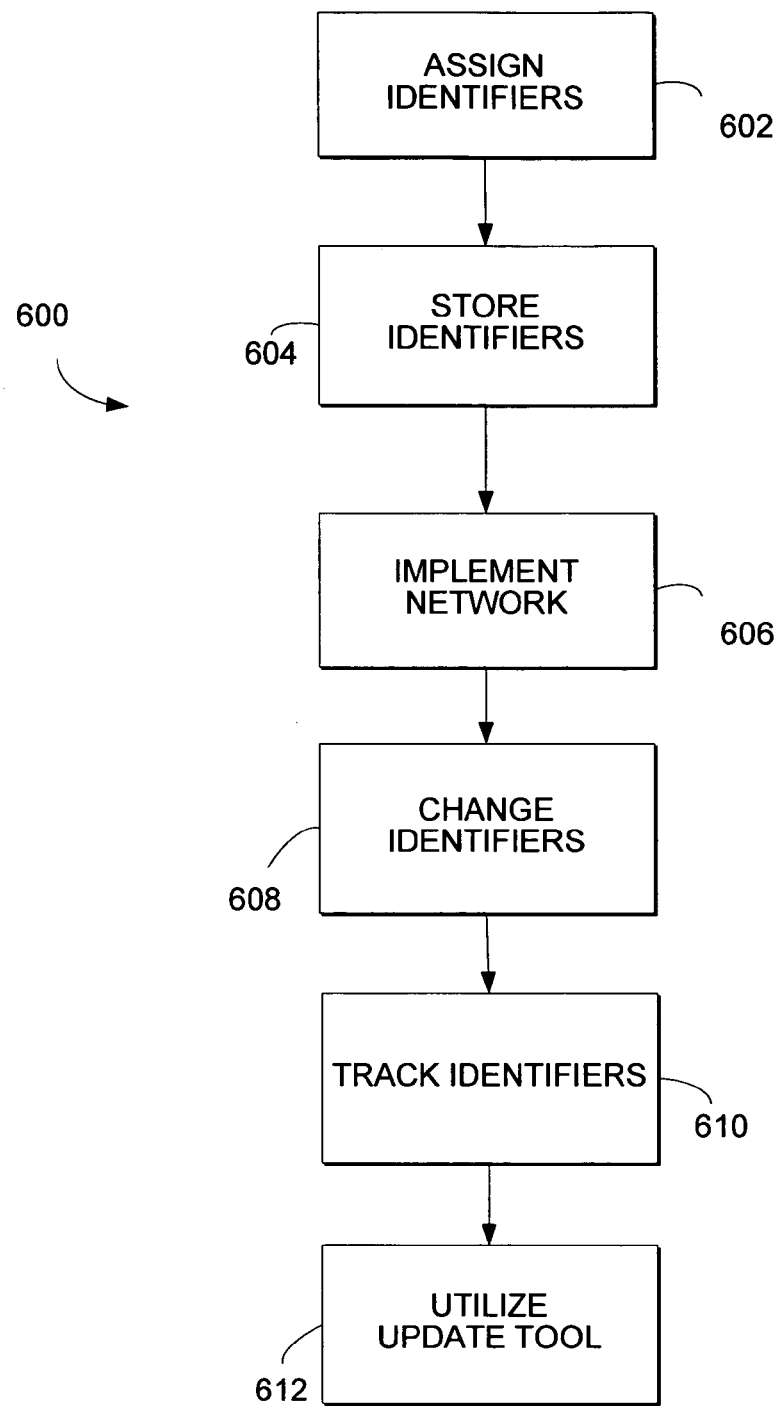
FIG. 6 illustrates a method in accordance with the present invention for maintaining network information.

FIG. 6 illustrates a method 600 for maintaining network information in accordance with the present invention. At a step 602, the method 600 assigns one or more identifiers to communication devices related to a network that is yet to be implemented. Such assignment, for example, may occur during the design of the network. At a step 604, the identifiers are stored in two different books. For example, identifiers may be stored in the previously discussed workbook and specification book. It is important to note that all of the identifier need not be stored in each book; one portion of the identifiers may be stored in the first book, while a different portion is stored in the second book. Further, the storage of the identifiers may occur at different times and may be performed by different entities.

The network is implemented at a step 606, and at least one of the identifiers is altered at a step 608. As will be appreciated by those skilled in the art, during the life of a network various changes may be necessary in the network, including changes to identifiers associated with communication devices. At a step 610, the method 600 tracks the changes to the identifiers in one of the two books by updating the book's listing of identifier assignments.

At a step 612, an update tool is utilized to update the two books. As previously set forth, each of the books includes a listing of at least a portion of the identifiers. Because changes to the assigned identifiers may not be reflected in each book, the update tool is utilized to conform the listings. The update tool may also be configured to populate identifiers in a book. Accordingly, the update tool may ensure that a complete and accurate listing of the assigned identifiers resides in each book. Those skilled in the art will recognize that the update tool may rely on techniques known in the art to access both books and to perform comparison and editing operations on the data residing in these books.

Figure 7:
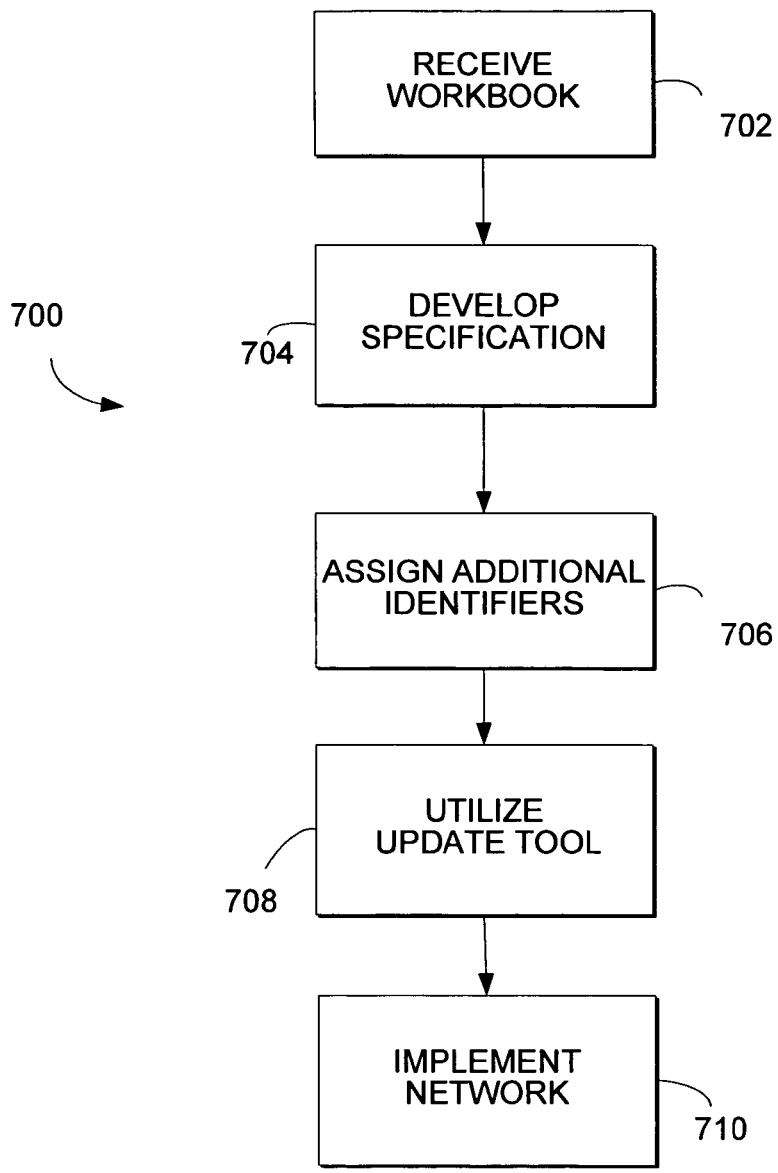
FIG. 7 illustrates a method in accordance with the present invention for coordinating the exchange of data during the implementation of a network.

FIG. 7 illustrates a method 700 for coordinating the exchange of data during the implementation of a network. At a step 702, the method 700 receives a workbook with a listing of identifiers assigned to communication devices in a yet-to-be implemented network. Various previously discussed embodiments of the workbook are acceptable for use with the present invention. At a step 704, a specification is developed describing the network. The specification may be considered a blueprint of the network and may contain information copied from the workbook. The specification may also contain additional identifiers not listed in the workbook. Such additional identifiers are assigned at a step 706. For example, while a first entity may assign the IDs contained in the workbook, a second entity may be responsible for assigning additional identifiers. Thus, differences may exist between the information residing in the workbook and the specification.

To reconcile differences between the two information sources, an update tool is utilized at a step 708. The update tool may identify data to be exchanged between the workbook and the specification. The tool may also verify that the information in each source is accurate and consistent. As previously discussed the update tool may be configured to automatically coordinate the exchange of information between the workbook and the specification. The method 700 implements the network at 710 in accordance with the information contained in the two sources.

Alternative embodiments and implementations of the present invention will become apparent to those skilled in the art to which it pertains upon review of the specification, including the drawing figures. Such alternative embodiments include utilizing the present invention to extract data from network devices and to troubleshoot errors on a communications network. Accordingly, the scope of the present invention is defined by the appended claims rather than the foregoing description.

What is claimed is:

1. A computer-implemented method of managing information using a data management system, the information describing a communications network, the method conducted using software and comprising:

assigning identifiers to a set of communication devices for use with the communications network;

maintaining a workbook, the workbook including device information associated with each of the set of communication devices, the workbook further including the assigned identifiers;

maintaining a network specification book in memory on the data management system, the network specification book including specifications regarding a configuration of a network;

receiving at the network specification book over a network connection an indication of a change in the configuration of the network, the indication including at least one of the assigned identifiers, the change being stored in the network specification book;

communicating the included at least one of the assigned identifiers from the network specification book to the workbook;

updating an entry in the workbook in response to the communicated at least one of the assigned identifiers, the entry being stored in memory and associated with the communicated at least one of the assigned identifiers;

communicating at least a portion of the device information from the workbook to the network specification book in response to the update to the entry, the portion of the device information being associated with the communicated at least one of the assigned identifiers; and updating the network specification book with the portion of the device information, the portion of the device information being stored in memory.

2. The method of claim 1, wherein at least a portion of said assigned identifiers are IP addresses.

3. The method of claim 1, wherein at least a portion of said assigned identifiers are IP addresses.

4. The method of claim 1, wherein at least a portion of said assigned identifiers indicate one or more device characteristics.

5. The method of claim 1, and further comprising using an update tool to determine whether at least a portion of said specifications is stored in said workbook.

6. The method of claim 1, further comprising using an update tool to automatically insert at least a portion of said workbook into said specification book.

7. The method of claim 1, further comprising using an update tool to identify one or more disparities between information stored in said workbook and information stored in said specification book.

8. One or more computer-readable media comprising instructions embodied thereon for executing the method of claim 1.

9. A system for managing data associated with a communications network, said system comprising:

a workbook stored in memory, the workbook including device information associated with each of a set of communication devices, the workbook further including an assigned identifier associated with each of the set of communication devices;

a network specification book stored in memory, the network specification book including specifications regarding the physical and logical layout of a network; and an update tool in communication with the workbook and the network specification book, the update tool operable to communicate at least one of the assigned identifiers from the network specification book to the workbook in response to receiving at the network specification book an indication of a change in the configuration of the network, the indication including the communicated at least one of the assigned identifiers, the update tool further operable to update an entry in the workbook in response to the communicated at least one of the assigned identifiers, the entry being associated with the communicated at least one of the assigned identifiers, the update tool further operable to communicate at least a portion of the device information from the workbook to the network specification book in response to the update to the entry, the portion of the device information being associated with the communicated at least one of the assigned identifier, the update tool further operable to update the network specification book with the portion of the device information.

10. The system for managing data of claim 9, wherein at least a portion of said assigned identifiers are assigned in accordance to an addressing standard.

11. The system for managing data of claim 9, wherein said network specification book includes at lest one identification indicia not listed in said workbook.

12. The system for managing data of claim 9, wherein said network specification book includes information indicating a said communications network.

13. The system for managing data of claim 9, wherein said update tool is configured to extract information from said workbook and to insert the extracted information into said network specification book.

14. The system for managing data of claim 9, wherein said update tool is configured to automatically exchange information between said workbook and said network specification book.

15. A computer-implemented method for managing information describing a communications network, the method conducted using software and comprising:

storing in memory a standardized format for listing one or more elements of information associated with a plurality of communications devices;

storing in memory a standardized set of specification information for describing a network, the specification information including information associated with the physical and logical layout of the communications network;

identifying a set of common items of information utilized by both said standardized format and said standardized set of specification information;

storing in memory the set of common items; and providing an update tool to automatically communicate any changes in said set of common items over a network between a first database and a second database, wherein said first database is formatted in accordance with said standardized format and wherein said second database is formatted in accordance with said standardized set of specification information.

16. The method of claim 15, wherein said first document is a workbook that includes a listing of said elements of information.

17. The method of claim 16, wherein said listing includes a set of identification indicia associated with said plurality of communications devices.

18. The method of claim 15, wherein said second document is a network specification book including specification information associated with said communications network.

19. The method of claim 15, wherein said update tool is configured to access both said first document and said second document.

20. The method of claim 15, wherein said update tool is configured to compare the content of said first document with the content of said second document.

* * * * *